June 23, 1959 J. W. FROST 2,891,662
VEHICLE ASH AND WASTE RECEIVER
Filed Sept. 14, 1956 5 Sheets-Sheet 1

INVENTOR.
JOHN W. FROST
BY
Attorney

INVENTOR.
JOHN W. FROST
BY John L. Diehl
Attorney

June 23, 1959  J. W. FROST  2,891,662
VEHICLE ASH AND WASTE RECEIVER
Filed Sept. 14, 1956  5 Sheets-Sheet 4

INVENTOR.
JOHN W. FROST
BY
Attorney

June 23, 1959   J. W. FROST   2,891,662
VEHICLE ASH AND WASTE RECEIVER
Filed Sept. 14, 1956   5 Sheets-Sheet 5

INVENTOR.
JOHN W. FROST
BY
Attorney

2,891,662

VEHICLE ASH AND WASTE RECEIVER

John Warren Frost, Appleton, Wis.

Application September 14, 1956, Serial No. 609,861

4 Claims. (Cl. 206—19.5)

This invention relates to disposal apparatus for ashes and other trash, garbage and refuse and more particularly to vacuum actuated apparatus for receiving and depositing within a vehicle such trash and refuse as ashes, cigarette butts, cigar stubs, cleansing tissues, paper, napkins, and the like.

Unlike currently available disposal apparatus the present invention provides means whereby cigarettes may be deposited in a suitable receptacle in or adjacent the dash board or instrument panel of an automobile and may be caused to be conveyed by means of vacuum to a suitable receptacle apart from the area occupied by passengers by a simple operation of a push button.

No means has been heretofore provided which is capable of receiving and disposing of many other sorts of trash, refuse and garbage such as cigar butts, apple cores, peach pits, banana peels, cleansing tissues, paper napkins, and the like. The use of paper napkins and cleansing tissues for various purposes within vehicles has become general and no means for disposing of such trash or of other trash such as gum wrappers, candybar wrappers, cigarette package wrappers, etc. has conventionally been available within the passenger compartments of automobiles. In most cases such trash is thrown from the windows of automobiles and with the increasing concentration of automobile vehicular traffic, roadsides often become littered. Not only is the littering of roads and streets with trash and garbage objectionable but in some places it is illegal.

The present invention provides suitable and efficient means for disposing of such trash as well as cigarette ashes.

It is therefore an object of this invention to provide a device for receiving cigarette ashes and cigarette butts and to convey such materials to a receptacle by operation of a push-button.

Another object is the provision of cigarette and trash disposer means in which ignitable materials and ignited objects may be deposited without ignition of the former.

Another object is vacuum-operable means for conveying cigar and cigarette refuse and bulky trash, garbage, waste paper, and the like from the interior of the passenger compartment of a vehicle to a receptacle by operation of a push-button.

Further objects will become apparent from the drawings and the following detailed description in which it is my intention to illustrate the applicability of the invention without thereby limiting its scope to less than that of all those equivalents which will be apparent to one skilled in the art.

In the drawings like reference numerals refer to like parts and.

Figure 1:
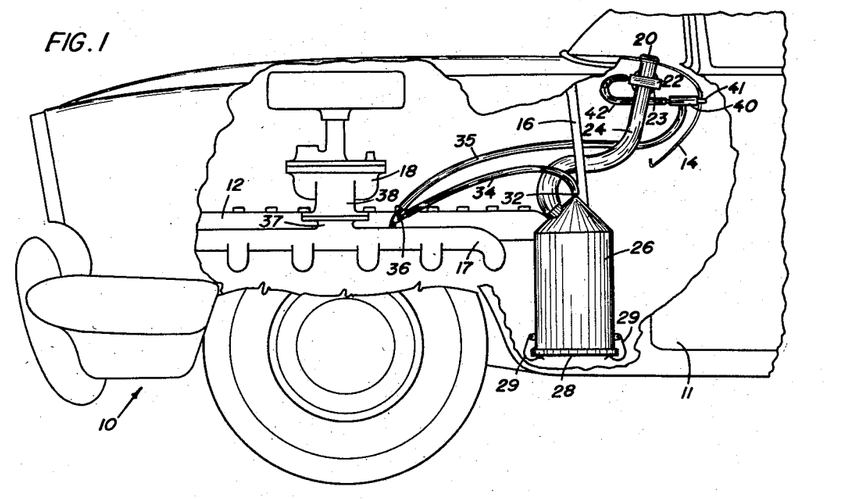
Figure 1 is a partially cutaway elevation of a portion of an automotive vehicle provided with the device of the invention.

Referring now to Figure 1 there is shown automobile 10 having body 11 and engine 12, dashboard or instrument panel 14, fire wall 16, intake manifold 17 and carburetor 18. Trash-receiving receptacle 20 is attached to instrument panel 14 and extends therethrough into the passenger compartment. Sliding blade valve 22 is attached to receptacle 20. A large smooth tube 24, circular in cross section extends from valve 22 through receptacle 26. Tube 24 may be corrugated or smooth and may be of brass, copper, steel or plastic. A tube of polyethylene is preferred because of its flexibility, smooth and somewhat self-lubricating interior surface and adaptability to providing tightly sealed joints at the ends with a minimum of attaching mechanism, but metal tubing may in some instances be used to advantage. Receptacle 26 may be disposed as shown in the space provided within the rear bulbous part of one of the front fenders, behind the wheel, tube 24 passing through fire wall 16. As more fully described hereinafter tube 24 is preferably of large diameter but may be either smaller or larger in diameter than shown. Receptacle 26 is provided with removable bottom 28 held in place by clips 29 and is provided with outlet 32 which may be connected by means of tube 34 to a suitable fitting 36 opening into intake manifold 17. Tube 34 may also be suitably attached to any other point in the intake system, such as for example, in riser 37 of intake manifold 17 or at base 38 on carburetor 18.

Pushbutton 41 is attached to instrument panel 14 in such manner as to cause it to extend through the instrument panel and be available to passengers in the passenger compartment and attached thereto in operative relationship there is provided small valve 40 which is preferably also of the sliding seal type as more fully described hereinafter. Valve 22 is provided with piston 23 and tube 42 may be provided connecting one side of valve 40 with the housing of piston 23.

Tube 35 connects the other side of valve 40 to manifold 17.

Container 26 is suitably disposed so that the bottom may be removed therefrom when the automobile is elevated on a "grease rack" or otherwise suitably disposed for lubrication of the underbody and the changing of the engine lubricating oil.

Receptacle 26 or a receptacle adapted to serve the same purpose may be located at any suitable point in the vehicle outside the passenger's compartment thereof as shown more fully in Figures 2, 24, 25, 26, 27, and 28. For example, a suitable receptacle may be placed forward and at one side of the radiator, behind the grill and ahead of one of the front wheels as shown at 45. A small receptacle which for example may consist of a glass jar may be attached to the fire wall on the engine side thereof as shown at 46. By redesign of instrument panels of conventionally manufactured modern automobiles space may be provided likewise to mount such a small receptacle on the passenger side of the fire wall underneath and behind the instrument panel as at 47 but generally the construction of modern automotive vehicles is such that no room is provided on either side of the fire wall, as at 46 or 47, in which a receptacle can be placed and it is one of the unique attributes of the present invention that it not only handles garbage and trash as well as cigars and cigarettes but is able to convey such materials to locations distant from the passenger compartment as at 45 or even entirely to the rear of the automobile, thus avoiding necessity for redesign of existing structures. Thus the receptacle may be located in the trunk compartment of the vhicle as shown at 48 or may be located in the rear portion of one of the rear fenders behind a wheel, as at 49. In addition to providing a pushbutton in the instrument panel 14 as at 41, a pushbutton may alternatively or additionally be attached to a floor portion of the passenger compartment as at 50 to provide for foot operation of the device.

Figures 3, 22:
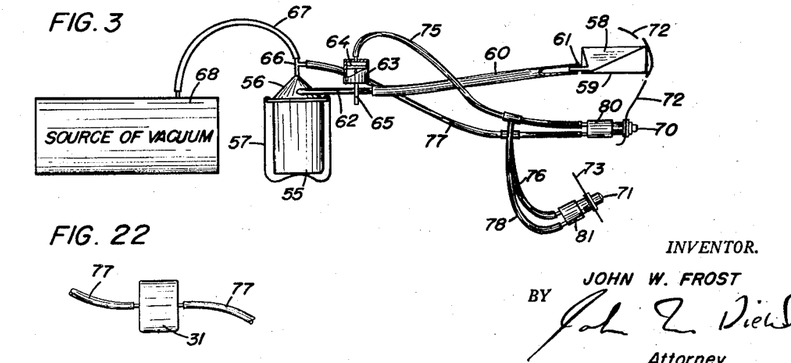
Figure 3 is a schematic view of another embodiment of the device according to the invention.
Figure 22 is a schematic view of a portion of the apparatus of the invention.

Referring now to Figure 3 there is shown schematically another embodiment wherein receptacle 55 which may consist of a glass jar is attached to conical top 56 by spring clip 57. A metal receptacle 58 having sloping sides is disposed within a conventional ash tray 59 which may be suitably mounted in brackets attached to the back of the instrument panel of an automobile. Flexible tube 60 leads from opening 61 at the base of receptacle 58 to inlet tube 62 leading into conical member 56. Sliding blade valve 63, normally closed, is disposed in line 60 and piston 64 attached thereto is disposed to operate said valve when a reduced air pressure is imposed upon the side of the piston most remote from the valve. Conical top 56 is provided with outlet 66 at the peak thereof which is connected by tube 67 to reduced pressure source 68. Pushbuttons 70 and 71 are mounted respectively in instrument panel 72 and floor 73 and disposed to operate valves 80 and 81 respectively. One side of each of these valves is connected to piston housing 65 by tubes 75 and 78 respectively; the other side of each of said valves is connected by tubes 77 and 76 respectively to reduced pressure source 68. Operation of either or both of pushbuttons 70 or 71 opens either one or both of valves 80 or 81, causing reduced pressure to be imposed upon piston 64 within housing 65 which thereupon opens valve 63 and provides a sudden surge of air through tube 60 which carries trash and debris from receptacle 58 into container 55. during operation container 55 is maintained at a reduced pressure and insufficient oxygen is present within such a container to cause material therewithin to ignite.

The source of reduced pressure may be either a portion of an internal combustion engine as hereinbefore described or may be a portion of a gas turbine engine or a mechanism for providing a reduced pressure which may be associated with either such type of engine.

The device of my invention differs from the devices of the same type or class which have been proposed for removing ashes and cigar butts from the passenger compartment of a vehicle. Heretofore it has not been possible to accomplish this result by operation of a pushbutton or like device having a limited or restricted range of movement.

The present invention represents an improvement over Patents 1,992,450, 2,461,815, 2,616,557, and 2,656,039. As mentioned heretofore and more fully described hereinafter it is necessary that the sliding member or blade be opened with great rapidity in order to provide a sharp surge of air to suitably convey trash articles through the valve and that the valve subsequently be closed with great rapidity in order to permit the apparatus to become ready for subsequent operation as soon thereafter as possible. These conditions are met in my invention by the provision of an actuating member such as piston or bellows and by the provision in the conveying member of a slidingly sealed valve preferably wherein the slidingly sealed member is a blade and by the provision of three-way valve means for alternatively admitting a vacuum or atmospheric air through said three-way valve means to said actuating member and finally by the provision of an actuating member for said three-way valve means, said actuating member being so disposed as to be operable upon the exertion of a minimum pressure thereupon by an operator and to cause the device to operate substantially independently of the thrust force, length of thrust and duration of thrust exerted by the operator so long as the condition of said minimum pressure is met. Such three-way valve means are shown in Figures 18, 19, 20 and 21.

Figure 4:
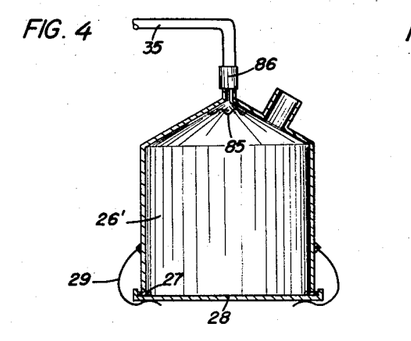
Figure 4 is a cross-sectional view of a part of the device as shown in Figures 1 and 2.

As shown in Figure 4, receptacle 26' may be provided with a screen 85 and a check valve 86 which may respectively serve the purpose of preventing any ashes and trash from entering tube 35 and may prevent back suction into receptacle 26' of explosive combustible mixture from intake manifold 17 or carburetor 18. As shown in Figure 4, bottom 28 may be easily removed from container 26' to empty the container by simply manually swinging spring clips 29 out of the way. During operation bottom member 28 is urged upwardly by air pressure on the outside thereof and is sealed tightly against gasket 27. If desired, a paper liner may be provided for the container to facilitate emptying trash and garbage therefrom.

Figure 5:
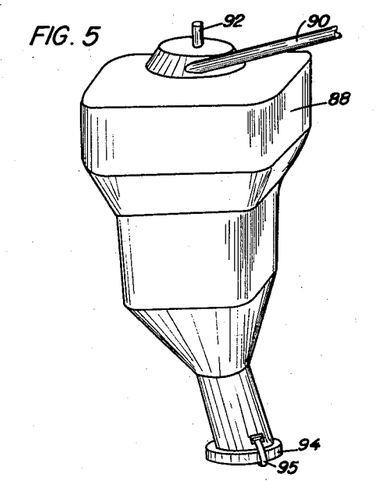
Figure 5 is a perspective view of another embodiment of a closed receptacle.

Referring now to Figure 5, a container 88 may be provided having portions of varying sizes and shapes to conform to suitable space within an automotive vehicle. Inlet 90 may be provided near the top of container 88 to admit trash thereinto and outlet 92 may be provided for attachment to a vacuum source. Closure 94 may be provided at the bottom of receptacle 88 removably held in place by spring clips 95 to facilitate the removable of refuse from the interior thereof.

Figure 6:
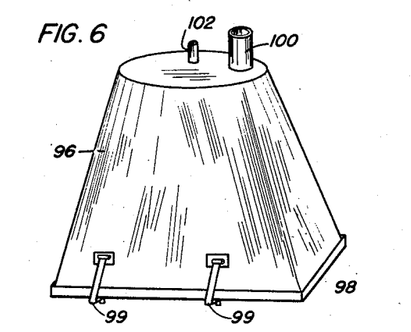
Figure 6 is a perspective view of another embodiment of a closed receptacle.

As shown in Figure 6, a container may also be much different in shape, being larger at the bottom than at the top. Thus container 96 has a relatively large area at the bottom closed by means of removably attached closure 98 held in place by spring clips 99. At the top thereof there may be provided inlet 100 and outlet 102.

The receptacles shown in Figures 4, 5 and 6, like container 26, may preferably be opened and their contents removed by a gasoline station attendant or garage man as part of the procedure for servicing the automobile at regular periods.

Figure 7:
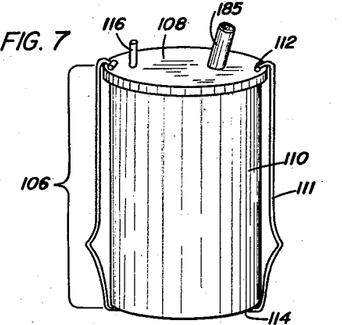
Figure 7 is a perspective view of another embodiment of a closed receptacle.

As shown in Figure 7, a receptacle may be provided wherein instead of taking the bottom off the receptacle and allowing the trash to fall therefrom into a suitable container, the receptacle itself may be removed from underneath the automobile and then dumped. Thus receptacle 106 comprises top 108 and bottom portion 110. Bottom portion 110 is removably attached to top 108 by extended hooked members 111 which are hingeably attached to top 108 at 112 and are hooked under the bottom of portion 110 at 114. Members 111 may be slightly flexed and unhooked from the bottom of portion 110 and this portion may then be removed and refuse dumped therefrom into a suitable container. This manual operation may be easily accomplished from underneath the vehicle while it is in a "grease rack" or lift. A suitable inlet 115 and outlet 116 are porvided in top 108.

Figure 8:
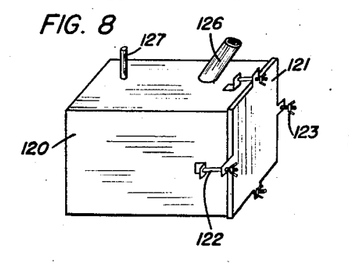
Figure 8 is a perspective view of another embodiment of a closed receptacle.

As shown in Figure 8 such a receptacle may suitably be adapted to be opened and emptied from one side thereof. Thus receptacle 120 is provided with closure member 121 attached on one side thereof by means of bolts 122 and wing nuts 123. The top portion of receptacle 120 is provided with inlet 126 and outlet 127.

A container such as that of any one of the several preceding figures may be provided with a plurality of inlets and a plurality of valves and trash-receiving receptacles such as valve 22 and receptacle 20, an inlet being provided for each such valve and trash-receiving receptacle. Thus container 96 might be provided with three inlets 100 and each inlet may be provided with a tube leading thereto from a separate valve such as valve 22. Likewise receptacle 106 may be provided with four inlets 115 and a conveying tube for trash may lead to each such inlet from a valve in each such tube. Thus a trash-receiving receptacle might be provided in each of two locations in the front seat of a passenger compartment and near the rear seat in a passenger compartment in tubes, provided with valves, more fully described elsewhere in this specification, and may lead from each of these trash-receving receptacles to a closed receptacle or container such as 26 or the receptacle of Figure 7 respectively by providing four inlets into such container.

Rather than providing the container with a plurality of inlets, a header may be provided into which a plurality of such tubes may lead and the header may be connected to the container or alternatively two or more tubes might lead to each of two or more headers and the headers might then be connected to the container.

Figure 9:
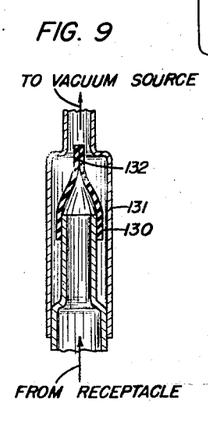
Figure 9 is a cross-sectional view of a device suitable for a check valve in the device of Figures 1 and 3.

The check valve may have the form of a Thomas beer vent as shown in Figure 9; rubber tube 130 is disposed within housing 131 and is flattened at one end so that a slit 132 provides the only passage through which gas may flow in the direction shown by the arrows. A flow of air from the receptacle towards the vacuum source causes slit 132 to be opened and allow passage of the gas due to the pressure differential across the device. However, a backward flow of gas in the direction opposite to that shown by the arrows creates a greater pressure on the outside of tube 130 than on the inside and causes slit 132 to be firmly closed.

Figure 10:
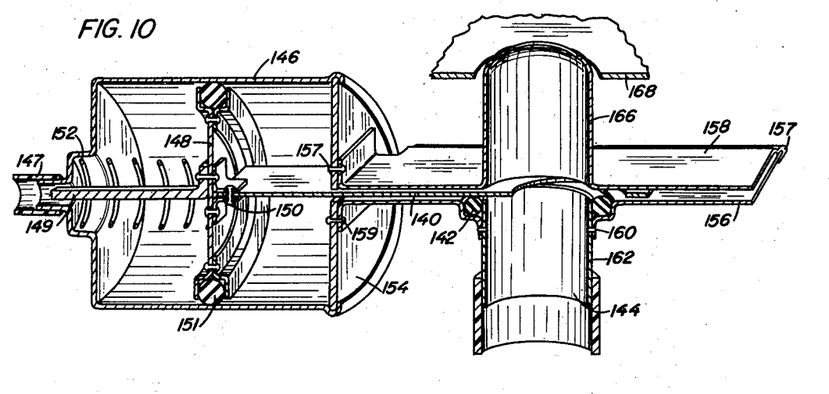
Figure 10 is a cross-sectional perspective view of a portion of the apparatus of the invention.

Referring now to Figure 10 there is shown a main valve and piston assembly wherein blade member 140 acts in slidingly sealed relationship with O-ring 142 to seal passage 144. Blade member 140 is caused to open when the side of piston housing 146 most remote therefrom is evacuated or partially evacuated and air pressure acts against piston 148 hingedly connected to blade 140 at 150. When the source of reduced pressure is disconnected or closed off from the left side of said housing, spring 152 acts against the other side of piston 148 and causes blade 140 to slide into closed position. Piston 148 may be provided with guide pin 149; housing 146 may be provided with tubular outlet 147 to which a tube or hose from a vacuum source may be connected. Piston 148 may further be provided with an O-ring 151 at its outer periphery to provide improved sealing and reduce leakage between the edge of the piston and the inner surface of housing 146. At the base of cylinder 146 there may be provided a plate 154 to prevent entry of dirt and the like thereinto and to act as a guide for blade 140. Blade 140 may be housed between plates 156 and 158 which may be attached as at 157 by rolling the edge of one over the other. Plate 156 may be stamped to provide a recess for O-ring 42 and may be joined at 160 to tube 162 to which there may be attached a rigid metal tube or a flexible plastic tube such as tube 164 to provide passage 144 for conveying garbage and trash from trash-receiving receptacle 166 to a closed evacuated receptacle such as receptacle 26 for receiving the trash. Receptacle 166 may be deep drawn or stamped out from plate 158 or may be made separately and attached thereto in any suitable manner. Preferably receptacle 166 projects through an instrument panel or dashboard surface 168 and may be attached thereto by any suitable means not shown. Plates 156 and 158 may be provided with respectively upwardly bent and downwardly portions at one end thereof which may be riveted or otherwise suitably attached to plate 154 at 157 and 159 in order to suitably position the piston and its housing with respect to blade 140 and its housing. It may be noted that blade 140 has no sealing relationship with plate 158 or with the port provided therein by the end of receptacle 166, but, if desired, such sealing relationship may be provided by stamping out plate 158 to provide an O-ring seat and placing an O-ring therein in the manner of O-ring 42. Receptacle 166 may have the form shown or may approximately equally suitably have the form shown in Figure 11, Figure 12 or Figure 13.

Figure 11:
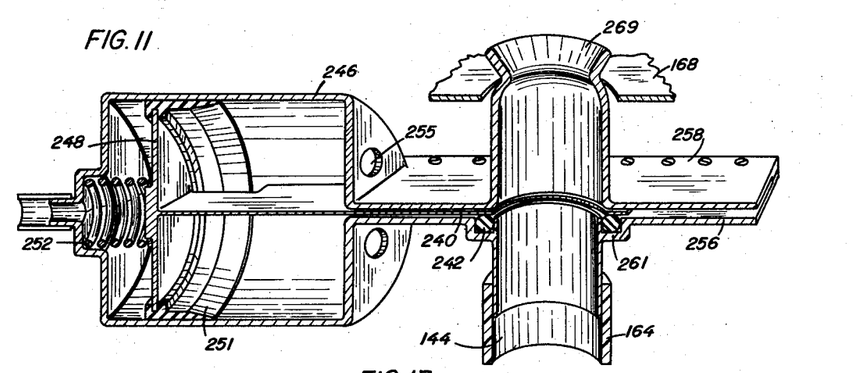
Figure 11 is a cross-sectional perspective view of another embodiment of the portion of the apparatus shown in Figure 10.

Referring now to Figure 11, there is shown another embodiment of a valve having a slidingly sealing member. Blade 240 is slidingly sealed against O-ring 242 when in the closed position, the valve being shown in the full open position. Blade 240 may be diecast in integrally attached relationship to piston 248 which may be contained within housing 246. In order to provide suitably sealing relationship between the outer edge of piston 248 and the inner cylindrical surface of cylindrical housing 246 there may be provided a suitable skirted sealing member 251 which suitably may be made of natural or synthetic rubber or plastic. Blade 240 is adapted to be caused to open by actuation of piston 248 in the same manner as piston 148 of Figure 10 and may be returned to the closed position in the same manner as in the embodiment of Figure 10 by the action of spring 252. Blade 240 may be provided with a housing comprised of plates 256 and 258. Each of plates of 258 and 256 may be integrally diecast with one half of housing 246. Holes 255 may be provided between each of these parts to provide for entrance of air into housing 246 on the rear side of piston 248 and also to provide for means for drainage from the device of juices, primarily fruit juices and the like which are scraped from pieces of fruit and veegtable refuse disposed by means of the device. Plate 256 may suitably be recessed at 261 to receive O-ring 242 and may be provided with extending tubular portion 266 to which tube 144 may be attached as in the embodiment of Figure 10 to provide passage 144. Trash-receiving receptacle 266 may be integrally diecast with plate 258 and preferably extends through instrument panel or dashboard 168. It may be provided with an expanding section or funnel 269 to facilitate the placement of trash therein.

Figure 12:
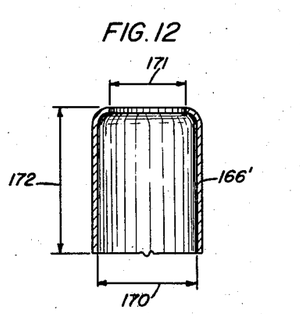
Figure 12 is a cross-sectional view of a trash-receiving receptacle according to the invention.
Figure 13:
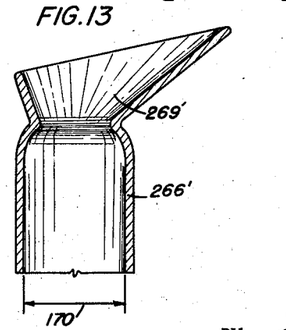
Figure 13 is a cross-sectional view of another embodiment of the receptacle of Figure 12.

In order to handle trash and garbage of relatively large size it is preferable that the trash-receiving receptacle have a constriction at or near its outermost end as shown in Figures 10 and 11 and more particularly shown in Figures 12 and 13. The inside diameter of the receptacle 166' indicated as 170 preferably is greater in size than the diameter at the constriction indicated as 171. The addition of a funnel or other shaped member having the general characteristics of a funnel such as portion 269 to receptacle 266' is desirable in some circumstances and is not objectionable so long as a constriction is provided having a diameter as at 171 of appreciably less than the inside diameter of passage 144 which is approximately substantially equal to that of inside diameter 170 of the trash-receiving receptacle. When diameter 170 for example is 1½ inches it has been found suitable for diameter 171 to be 1¼ inches. The constriction functions to cause garbage and trash to be compressed into sufficiently small wads or bundles to pass through passage 144 without undue friction. It should be noted that the provision of a piston such as 148 or 248 and means for applying reduced pressure thereto provides a uniformly rapid opening speed for blade 140 or blade 240 respectively with the result that the sudden surge or entrance of air through passage 144 is of very great velocity. As a result it has been found possible, with a length 172 of four to five inches and a receptacle 26 having a capacity of five gallons to cause all manner of objects to travel through a polyethylene pipe 1½ inches inside diameter at an extremely high rate of speed. With apparatus having these dimensions it has been found quite feasible to stuff four or five cleansing tissues into trash-receiving receptacle 166' and then convey them all together at very high velocity along with cigarette butts, ashes and the like into receptacle 26. It has likewise been found possible to rapidly convey one page of a standard size newspaper (as distinguished from tabloid size) through the receptacle if folded once or twice and layed across the top of receptacle 166 with the receptacle extending vertically upward, vertically downward or horizontally, the suction being sufficient and sufficiently sharply applied to draw the newspaper together into a compact wad and convey it through the tube quite rapidly. At the same time small objects such as cigarette butts and matches are suitably conveyed through the device.

A trash receiving receptacle such as receptacle 20, receptacle 58, receptacle 166', or receptacle 266' may be located at any suitable point within the interior of the passenger compartment of a vehicle (such as an automobile, truck, bus, or even passenger boat). For example, it may be located in the dashboard or in a wall of the passenger compartment, or it may extend into the passenger compartment through the interior surface of one of the doors leading thereinto or may suitably be located in an arm rest.

An important criteria of a suitable apparatus for disposing of such trash is the duration of time which must take place between one actuation of the device and a following actuation of the device. With a system having the dimensions heretofore described operated in conjunction with a 90 horsepower V-8 automobile engine, the connection from the intake manifold to receptacle 26 being through a tubing ⅜" inside diameter having a length of about four feet, 11 seconds were required after closing blade 140 or 240 for the vacuum to reach 10 inches of mercury and 19 seconds were required for the vacuum to reach 15 inches of mercury. The engine pumped only to 16 inches of mercury when the apparatus was detached. With a small apparatus which works suitably for cigarettes wherein passage 144 has an inside diameter of ½ inch, tube 164 has a length of about ten feet and the capacity of the closed receptacle with which tubing 164 communicates is one quart (mounted as shown at 46 or 47 in Figure 2) the same engine pumps the system down to a vacuum of 10 inches of mercury in about three seconds and a 15" vacuum in five seconds. However, with apparatus having these smaller dimensions, operation of the apparatus to discharge cigarette butts from the trash-receiving receptacle into the closed receptacle normally does not cause the vacuum in the system to fall to zero but will normally cause a vacuum of for example 18 inches to be reduced to about 14 or 15 inches with the result that the apparatus may be used a second and even a third time without any period of delay at all. Both apparatus having the larger dimensions and apparatus having the smaller dimensions most suitably and satisfactorily operate at vacuums of 10 or 12 inches or above, up to 20 or 24 inches, although operating to some extent at lower vacuums or higher pressures such as a vacuum of some three to eight inches.

Throughout this specification I have in some cases referred to vacuum but in most part referred to reduced pressure, it being my intent to make clear throughout that an absolute or total vacuum or a vacuum approaching an absolute or total vacuum such as one in which there is a remaining pressure of twenty millimeters or less of mercury is not at all necessary for the operation of my system; it being necessary only that air pressure be reduced within the system to the extent hereinbefore described. When utilized with a larger engine than a 90 horsepower engine, such as for example a 270 horsepower engine, the "recovery time" of the apparatus is obviously much lower.

It is normally desirable that blade 140 or blade 240 be opened with great rapidity in order to provide a sharp surge of air through passage 144 to suitably convey trash articles therethrough. It is also generally preferable that the valve be closable with equal celerity. At the same time it is generally preferred that it be possible to operate the device when there is no vacuum or reduced pressure within receptacle 26 i.e., passage 144 or when the pressure therein is substantially atmospheric. Such a condition can obtain if for any reason a trash article becomes jammed in the port of blade 140 or blade 240 and clearing of the jammed article is normally preferably accomplished by several repeated operations of blade 240 or 140. This may be accomplished by providing a source of reduced pressure connected to the side of housing 146 or 246 most remote from the blade which is independent or at least partially independent of the pressure obtaining within passage 144 or receptacle 26. For example as shown in Figure 1, tube 35 may be attached directly to the engine at the same point that the tube leading to receptacle 26 is attached. Alternatively or in addition there may suitably be provided a restricting orifice in tube 67 between said point of attachment and receptacle 55, as shown at 54, in order to provide dynamically for a lower pressure in tube 77 than in outlet 66 during operation of source 68. Alternatively there may be provided a subsidiary small accumulator or vacuum tank 31 in either tube 77 or tube 35 as shown in Figure 22. However this is generally not preferred due to consideration of limitations imposed by space and economy.

It may be pointed out again that provision for mere direct manual operation of a sliding valve member is found to be unsatisfactory. Although a rather sharp tap or blow of the fingers may be sufficient to move the slidingly sealing member with sufficient rapidity to properly operate the system, it is quite common for the user of such a system to cause the valve to move too slowly and it has been found inevitable that anyone will under some circumstances move the valve with sufficient slowness to cause a great deal of air to pass through the valve before it is sufficiently open to allow trash to pass therethrough, such initial flow of air being insufficiently great in volume to carry the trash with it but on the other hand of sufficiently great volume to so reduce the pressure in passage 144 and receptacle 26 so that subsequent full opening of the valve is insufficient to provide an adequate flow of air to carry trash articles through passage 144.

Figure 14:
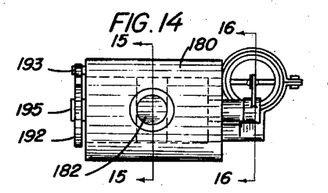
Figure 14 is an elevation from one side of another embodiment of a portion of the device shown in Figures 12 and 13.
Figure 15:
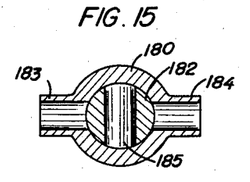
Figure 15 is a cross-sectional view taken on line 15—15 in Figure 14.
Figure 16:
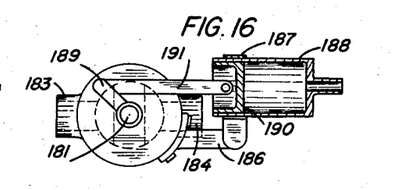
Figure 16 is a partially cross-sectional elevation taken on line 16—16 in Figure 14.
Figure 17:
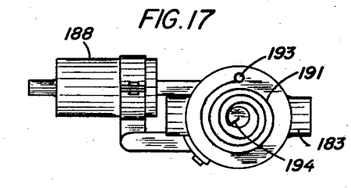
Figure 17 is an elevation from one end of that portion of the apparatus shown in Figure 14.

In Figure 14 there is shown another embodiment of a valve suitably having a slidingly sealed surface connected to a piston suitable for use in closing and opening passage 144. Housing 180 contains plug 182 and is provided with an inlet 183 and an outlet 184. Plug 182 is provided with a transverse hole 185 extending perpendicular to the axis thereof and adapted to be aligned with said inlet 183 and outlet 184 upon rotation of plug 182 through 90°. Housing 180 may be provided with member 186 extending from one end thereof and attached to said extending portion 186 there may be provided cylinder 188, such attachment, for example, may be made by means of band 187 extending around cylinder 188. Plug 182 is provided with axial extension 181 to which crank arm 189 is attached. Piston 190 is disposed within cylinder 188 and connected to the outer end of crank arm 189 through connecting rod 191, the valve being shown in the closed position. When the pressure within cylinder 188 is reduced air pressure acting against the side of piston 190 more remote from housing 180 causes the piston to move in the cylinder and causes the valve to rotate through about 90 degrees thereby opening the passage from inlet 182 to outlet 183. When application of reduced pressure to cylinder 188 is terminated the valve is caused to be returned to the closed position by the action of spiral spring 192 which may be hooked at one end over member 193 extending from housing 180 and may have its other end extending through slot 194 in axially extending portion 195 of plug 182. Generally the embodiment illustrated in Figures 14, 15, 16 and 17 is less suitable than either embodiment illustrated in Figures 10 or 11 but may nonetheless be used if desired. Generally it is preferable that the valve housing be provided with a projecting ridge against which slidingly sealing member may seal. Such ridge is provided by O-ring 142 and 242 but cannot suitably be provided in the valve of Figures 14 to 17. The ridge, however, may be integral with the housing and may be metal; however sealing is facilitated by the use of such a device as an O-ring.

Figures 23, 24:
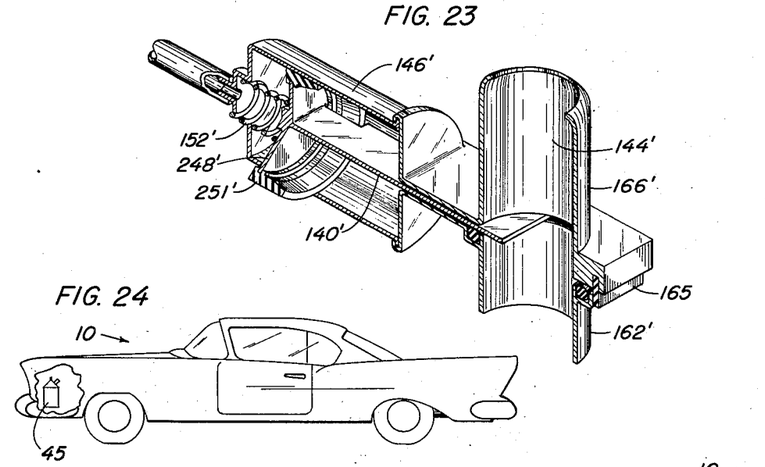
Figure 23 is a cross-sectional perspective view of another modification of a portion of the apparatus of the invention.
Figure 24 is a modification of Figure 2 showing an alternate position of the container embodiment.
Figure 25:
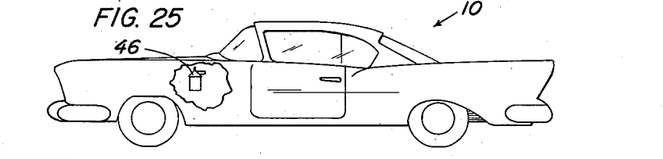
Figure 25 is another modification of Figure 2 showing an alternate position of the container embodiment.
Figure 26:
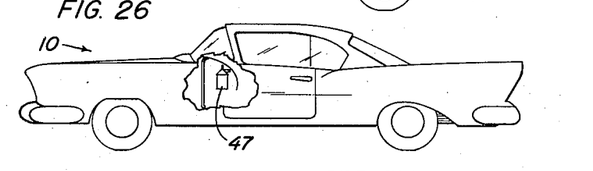
Figure 26 is another modification of Figure 2 showing an alternate position of the container embodiment.
Figure 27:
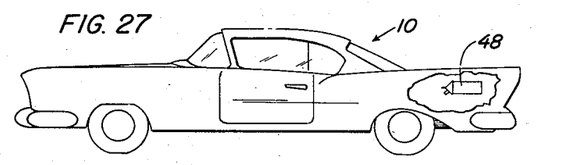
Figure 27 is another modification of Figure 2 showing an alternate position of the container embodiment.
Figure 28:
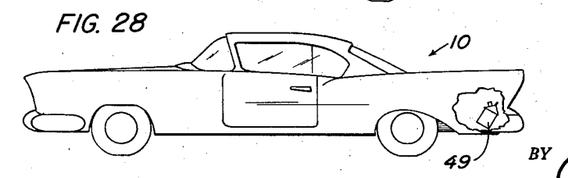
Figure 28 is another modification of Figure 2 showing an alternate position of the container embodiment.

Referring now to Figure 23 there is shown another embodiment of a valve having a slidingly sealing member. Blade 140' closes passage 144 provided by tubes 162' and 166'. The valve shown in Figure 23 differs from that shown in Figures 10 and 11 primarily in that blade 140' contains no hole therein and is shorter than either blade 140 or 240 so that in the open position it does not extend alongside passage 144' whereas in the valves of Figures 10 and 11 the opening in passage 144 is provided by a hole in the blade. The complete sealing of passage 144' is provided by a rubber flap 165. Blade 140' is adapted to be driven by piston 248' provided at its outer edge with sealing ring 251' operating in cylinder 146'.

It may be mentioned that the apparatus of my invention may suitably be used in theatres, taverns, hotels and the like and may be used in various types of vehicles other than automobiles, for example, boats, passenger liners, aircraft and the like.

Figure 18:
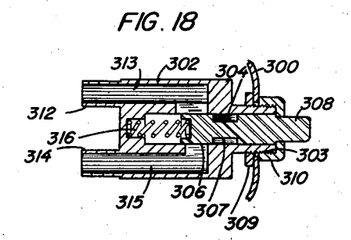
Figure 18 is a cross-sectional view of a push-button mounted on a dash board or instrument panel and a push-button-operated valve adapted to constitute part of the apparatus of the invention.
Figure 21:
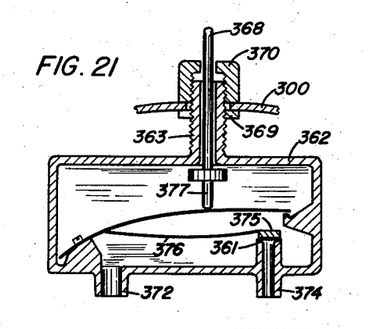

There are shown in Figures 18 and 21 several embodiments of pushbutton operated valves suitable for use in the apparatus of my invention.

Referring now to Figure 18 there is shown valve housing 302 having internal cylindrical bore 304 and slidably and rotatably disposed therein, valve plunger 306 terminating in pushbutton 308. Housing 302 may be attached to dashboard or instrument panel 300 by backup nut 309 and retainer nut 310, each threadably engaged with the threaded extending portion 303 thereof. Housing 302 is provided with tubes 312 and 314 extending therefrom and with tubular passages respectively 313 and 315 entering bore 304 on opposite sides thereof. Return spring 316 is provided disposed between the recessed end of bore 304 and the end of plunger 306. Plunger 306 is provided with recessed groove 307 extending therearound so that when button 308 is pushed, plunger 306 travels axially within bore 304 and passage 313 is caused to communicate with passage 315 through the space provided by groove 307. When pressure is released on button 308, spring 316 causes the valve to travel into the closed positioon shown. Either tube 312 or tube 314 may serve as an inlet and the other tube may serve as an outlet.

Figure 19:
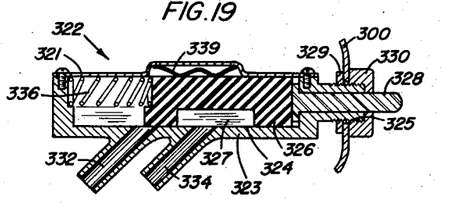
Figures 19, 20 and 21 are cross-sectional views of other embodiments of a push-button mounted on a dash board or instrument panel and a push-button-operated valve adapted to constitute part of the apparatus of the invention.

Referring now to Figure 19 there is shown a housing indicated generally as 322 which may comprise respectively portions 321 and 323 attached to each other by means of screws as shown. Within housing 322 there may be provided a sliding member 326 having a recess 327 therein. Tubes 332 and 334 may extend from member 323 to provide an inlet and an outlet. Return spring 336 may be disposed between one end of said housing and sliding member 326. A leaf or zigzag spring 339 may be disposed between sliding member 326 and housing member 321 to bias sliding member 323 into sealed relationship with flat surface 324 of member 323. Pushbutton 328 may be provided extending through instrument panel or dashboard 300 in axial relation to the direction of movement of sliding member 326. Housing 322 may be attached to dashboard 300 by backup nut 329 and retainer nut 330 threadably attached to threaded portion 325 thereof. When button 328 is pushed, sliding member 326 is caused to slide along surface 324 until tubes 332 and 334 communicate through recess 327. When pressure is released on button 328 spring 336 acts to cause member 326 to slide into the position shown, closing the valve.

Figure 20:
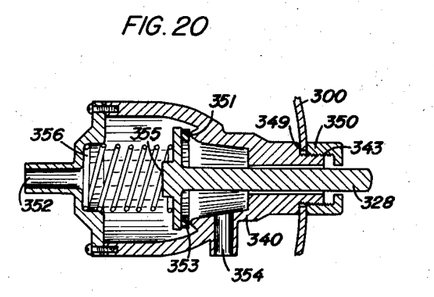

Referring now to Figure 20, there is shown another embodiment generally less suitable in nature than those of Figures 18 and 19, each of which comprises a passage which is closed by a slidingly sealing member. Housing 342 is attached to dashboard or instrument panel 300 by retainer nut 350 acting against shoulder 349, threadably attached to threaded portion 343 of housing 340. Housing 340 is provided with an internal seat 351. Disc 355 provided with gasket 353 seats thereon and may be forced off said seat by pushbutton member 328 attached thereto to cause tube 352 to communicate with tube 354. Spring 356 is disposed within housing 340 to urge disc 355 against seat 351 and close the valve when pressure is released on button 328.

Referring now to Figure 21 there is shown another embodiment wherein valve housing 362 is attached to dashboard or instrument panel 300 by backup nut 369 and retainer nut 370 threadably engaged with the threaded portion 363 extending from housing 362. Extending from the opposite side of housing 362 there are provided tube 372 through which air may pass into the housing and tube 374 through which air may pass out of the housing to a suitable vacuum source. Tube 374 extends through the wall of the housing into the interior thereof, terminating in seat 361. Tube 374 is closed by disc 375 seated on seat 361. Disc 375 is attached to leaf spring 376. Disposed in contacting relationship with leaf spring 376 is rod 377 terminating in button 368. When pressure is applied to button 368, motion is transmitted through rod 377 to spring 376 and spring 376 is caused to snap into a position having a curvature opposite to that shown. Disc 375 is thereby lifted from seat 361 and the valve is opened so that air may pass through the interior of housing 362 and thence outwardly through tube 374. When pressure is released on button 363, spring 376 again assumes the position as shown and causes disc 375 to seat against seat 361 thereby closing tube 374.

It will be noted that although the valves illustrated in Figures 18 to 21 are of various types, each is operated by a pushbutton and not by a member which is twisted, rotated, or moved in a combination of transverse and rotational directions such as a toggle switch or knife switch. Neither is any one of these valves operated by manual application of a sliding motion or movement.

Figure 2:
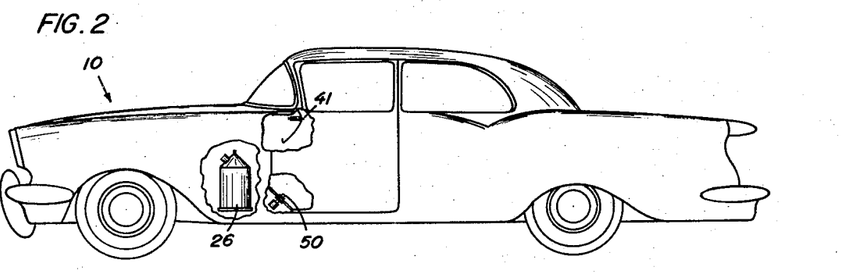
Figure 2 is a partially cutaway elevation of an automotive vehicle showing parts of the device in various locations according to the invention.

An operating device for a valve may, however, utilize such movements, although the pushbutton motion is preferable. It is desirable that the combination of valve and operating device therefore provide for actuation of the valve upon the exertion of a certain minimum force of thrust against the operating member independent of the length of the thrust, the excess force of thrust and duration of thrust of the operator's finger. The valve may be operated at a considerable distance from the operating member if desired. The operating member, that is the push button or like device adapted to actuate the valve independent of most of the characteristics of the movement of the operator's finger may be located substantially anywhere within the passenger compartment. In Figures 2 and 3 such actuating members are shown located both upon the dash-board and upon the floor of the passenger vehicle. Such an actuating member may be located equally well in other postions such as on the door or on the back of the back seat or on the armrest or the like and, if desired, suporting means for the operating member for the valve may if desired be enclosed within a housing which also encloses a valve in the conveying line such as that of Figures 10, or 11 or valve 22 shown in Figure 1.

It should be noted that the force required to operate this valve is much less, of course, than the force which is imposed upon the valve in the trash-conveying line by the bellows or piston subjected to differential pressure thereacross, the ratio of the two forces being as great as 1 to 100 and being generally no less than 1 to 10.

Generally for long continued service without leakage in handling large flows of air the valves of Figures 18 and 19 are preferred wherein the ports are closed by sliding a slidingly sealing member in sealing contact with the port. The action of these valves is facilitated if, for example, plunger 306 and sliding member 326 likewise is made of a plastic such as nylon or polyethylene or a rubber of relatively high durometer.

It may thus be seen that the invention is broad in scope and is not to be limited excepting by the claims.

Having thus disclosed my invention I claim:

1. In a device of the type described the combination of a compartment adapted to contain humans, a substantially enclosed space inadapted to contain humans spaced apart from said compartment, a source of reduced air pressure disposed in said space, a closed container communicating with said source, a trash-receiving receptacle disposed within said compartment, a tubular conveying member providing a communicating passage between said trash-receiving receptacle and said closed container, a valve having a slidingly closing member disposed in said conveying member to close said passage by sliding sealing action against a substantially stationary member, said sliding member biased toward closed position, a cylinder member having sides and a rear wall, tubular means connecting said cylinder member through said rear wall to said source of reduced pressure, a piston member disposed to travel axially toward said rear wall in urged response to reduction of pressure in said cylinder member, means maintaining said rear wall substantially stationary with respect to said passage, said piston member attached to said sliding closing member so that said axial travel of said piston member moves said sliding member to open said passage, a manually movable valve operating member disposed within said compartment, a valve in said tubular means, said manually movable member disposed to open said valve when subjected to a minimum predetermined manual pressure.

2. The device of claim 1 further characterized by said cylinder and piston members comprising a cylinder having a smooth cylindrical bore with a closely fitted piston longitudinally slidable therein.

3. In a device of the type described the combination of: a compartment adapted to contain humans, a substantially enclosed space inadapted to contain humans spaced apart from said compartment, a source of reduced air pressure disposed in said space, a closed container communicating with said source, a trash-receiving receptacle disposed within said compartment, a tubular conveying member of substantially circular cross-section providing a communicating passage between said trash-receiving receptacle and said closed container, a valve having a slidingly closing member disposed in said conveying member to close said passage by sliding sealing action against a substantially stationary member, said sliding member biased toward closed position, a cylinder member having sides and a rear wall, tubular means connecting said cylinder member through said rear wall to said source of reduced pressure, a piston member disposed to travel axially toward said rear wall in urged response to reduction of pressure in said cylinder member, means maintaining said rear wall substantially stationary with respect to said passage, said piston member attached to said sliding closing member so that said axial travel of said piston member moves said sliding member to open said passage, a manually movable valve operating member disposed within said compartment, a valve in said tubular means to thereby provide a closed communicating passageway between one side of said valve and said cylinder member and a closed communicating passageway between the other side of said valve and said reduced pressure source, said manually movable member disposed to open said valve when subjected to a minimum predetermined manual pressure, and to provide no additional response to greater manual pressure and to length of time and distance over which said manual pressure is applied.

4. The device of claim 3 further characterized by said cylinder and piston members comprising a cylinder having a smooth cylindrical bore with a closely fitted piston longitudinally slidable therein.

References Cited in the file of this patent

UNITED STATES PATENTS

| | | |
|---|---|---|
| 1,347,192 | Tygard | July 20, 1920 |
| 1,992,450 | Sporman | Feb. 26, 1935 |
| 2,461,815 | Gill | Feb. 15, 1949 |
| 2,559,178 | Thompson | July 3, 1951 |